(12) United States Patent
Oka et al.

(10) Patent No.: US 7,148,726 B2
(45) Date of Patent: Dec. 12, 2006

(54) DIGITAL SIGNAL BUFFER CIRCUIT

(75) Inventors: Toshihide Oka, Tokyo (JP); Hironobu Ito, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 114 days.

(21) Appl. No.: 10/961,203

(22) Filed: Oct. 12, 2004

(65) Prior Publication Data

US 2005/0151565 A1    Jul. 14, 2005

(30) Foreign Application Priority Data

Jan. 14, 2004    (JP) ............................. 2004-006686

(51) Int. Cl.
*H03K 19/094* (2006.01)
*H03H 11/76* (2006.01)

(52) U.S. Cl. ........................... 326/86; 326/27; 327/274

(58) Field of Classification Search ............ 326/26–27, 326/82–83, 86, 113, 115, 127; 327/261, 327/269–270, 272, 274

See application file for complete search history.

(56) References Cited

U.S. PATENT DOCUMENTS

| | | | | |
|---|---|---|---|---|
| 6,351,191 B1* | 2/2002 | Nair et al. | ..................... | 331/57 |
| 6,498,511 B1* | 12/2002 | Tamura et al. | ................. | 326/86 |
| 6,831,492 B1* | 12/2004 | Abbasi et al. | .............. | 327/158 |
| 6,956,442 B1* | 10/2005 | Groen et al. | ................... | 331/57 |
| 6,975,132 B1* | 12/2005 | Groen et al. | ................... | 326/27 |

FOREIGN PATENT DOCUMENTS

JP    2003-204291    7/2003

OTHER PUBLICATIONS

Sherif Galal, et al. "10Gb/s limiting Amplifier and Laser/Modulator Driver in 0.18 µm CMOS Technology", ISSCC 2003, Digest of Technical Papers, pp. 188-189, no month.

* cited by examiner

*Primary Examiner*—James Cho
*Assistant Examiner*—Jason Crawford
(74) *Attorney, Agent, or Firm*—McDermott Will & Emery LLP

(57) ABSTRACT

A delay circuit is provided with a plurality of variously sized equalization transistors, a plurality of equalization resistors having different resistance values, a plurality of equalization capacitors having difference capacitance values, and switch circuits. The switch circuits are used to make selections from among the equalization transistors, equalization resistors, and equalization capacitors for the purpose of adjusting the amplitude level and delay amount of a digital inverse signal.

10 Claims, 5 Drawing Sheets

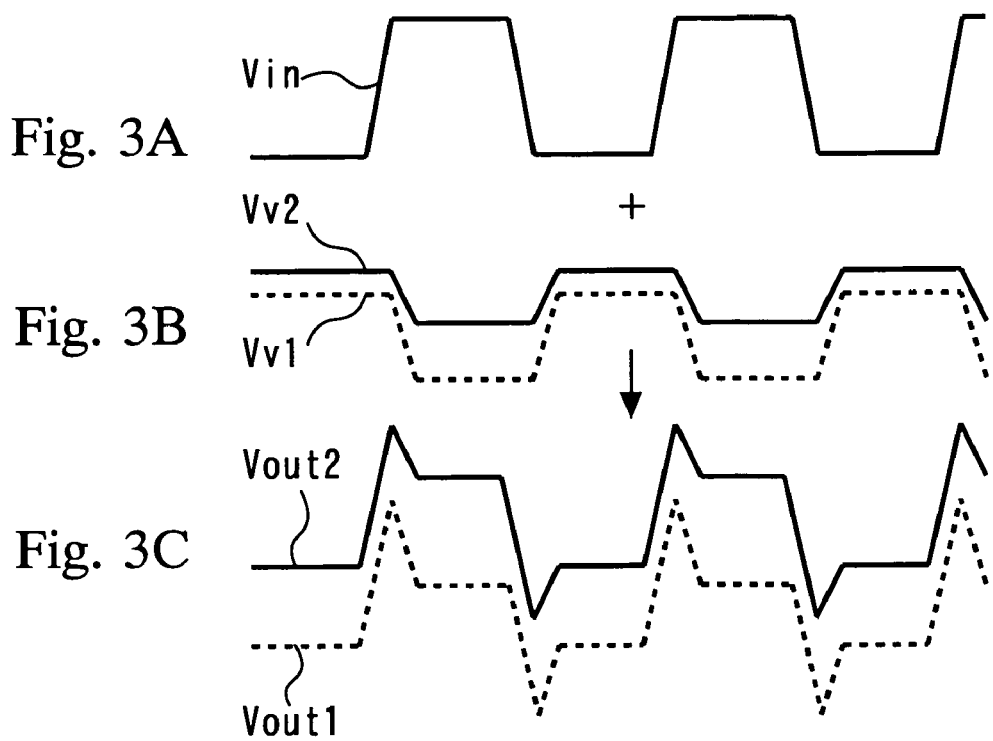
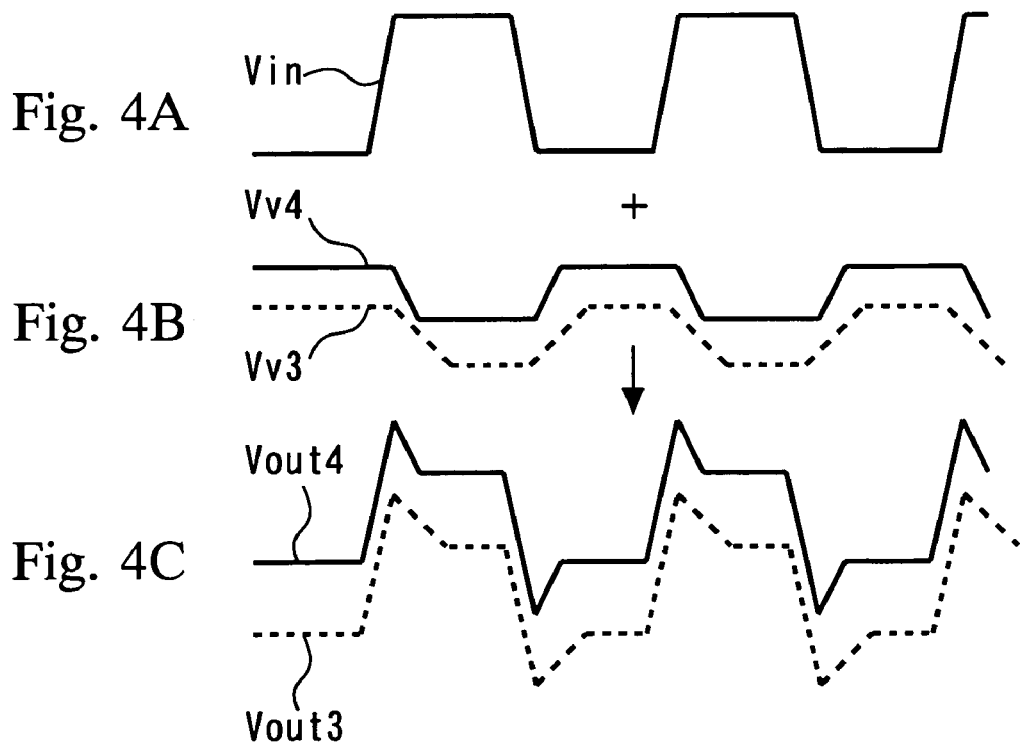

DIGITAL SIGNAL BUFFER CIRCUIT

BACKGROUND OF THE INVENTION

1. Field of the Invention

The present invention relates to a digital signal buffer circuit that is used, for instance, in a communication system for digital signal transmission, to generate an output in which a digital signal change is emphasized.

2. Background Art

A communication system disclosed, for instance, by Japanese Patent Laid-open No. 204291/2003 is provided with a transmission circuit that is mounted at the transmitting end of a communication system transmission path, and a reception circuit that is mounted at the receiving end of the communication system transmission path. The transmission circuit and reception circuit are both provided with an equalization circuit. The transmission circuit and reception circuit both include a digital signal buffer circuit. The buffer circuit having an equalization circuit adds a delayed, small-amplitude digital inverse signal to an input digital signal and generates an output digital signal, in which an input digital signal change is emphasized, to provide improved communication performance.

SUMMARY OF THE INVENTION

The present invention relates to a digital signal buffer circuit having the above-mentioned type of equalization circuit, and provides a digital signal buffer circuit that is improved to permit level adjustments over a wider bandwidth.

The above objects of the present invention are achieved by a digital signal buffer circuit, which includes an equalization circuit for generating a digital inverse signal that is delayed from an input digital signal and obtained by inverting the input digital signal. The equalization circuit includes a plurality of variously-sized equalization transistors. The equalization circuit also includes a delay circuit capable of changing the delay amount. The equalization circuit further includes a switching circuit for switching between the plurality of transistors and changing the delay amount of the delay circuit.

The above objects of the present invention are achieved by a digital signal buffer circuit. The digital signal buffer circuit includes a first buffer for receiving an input digital signal, a second buffer for receiving the output of the first buffer, and a third buffer for generating an output digital signal upon receipt of an output from the second buffer. The second buffer includes an equalization transistor, which generates a digital inverse signal that is obtained by inverting the input digital signal and delayed. The second buffer also includes switches between a first feedback line for feeding the output of the second buffer back to the equalization transistor and a second feedback line for feeding the output of the third buffer back to the equalization transistor.

The above objects of the present invention are achieved by a digital signal buffer circuit. The digital signal buffer circuit includes a first buffer for receiving an input digital signal, and a second buffer for generating an output digital signal upon receipt of an output from the first buffer. The second buffer includes an equalization transistor for generating a digital inverse signal that is obtained by inverting the input digital signal and delayed. The digital signal buffer circuit forms a delay path between the output of the first buffer and the equalization transistor, which includes a switch and a low-pass filter.

Other objects and further features of the present invention will be apparent from the following detailed description when read in conjunction with the accompanying drawings.

BRIEF DESCRIPTION OF THE DRAWINGS

FIG. 3A to FIG. 3C show the amplitude adjustment of the digital signal;

FIG. 4A to FIG. 4C show the delay amount adjustment of the digital signal;

BEST MODE FOR CARRYING OUT THE INVENTION

Embodiments of the present invention will now be described with reference to the accompanying drawings.

First Embodiment

Figure 1:
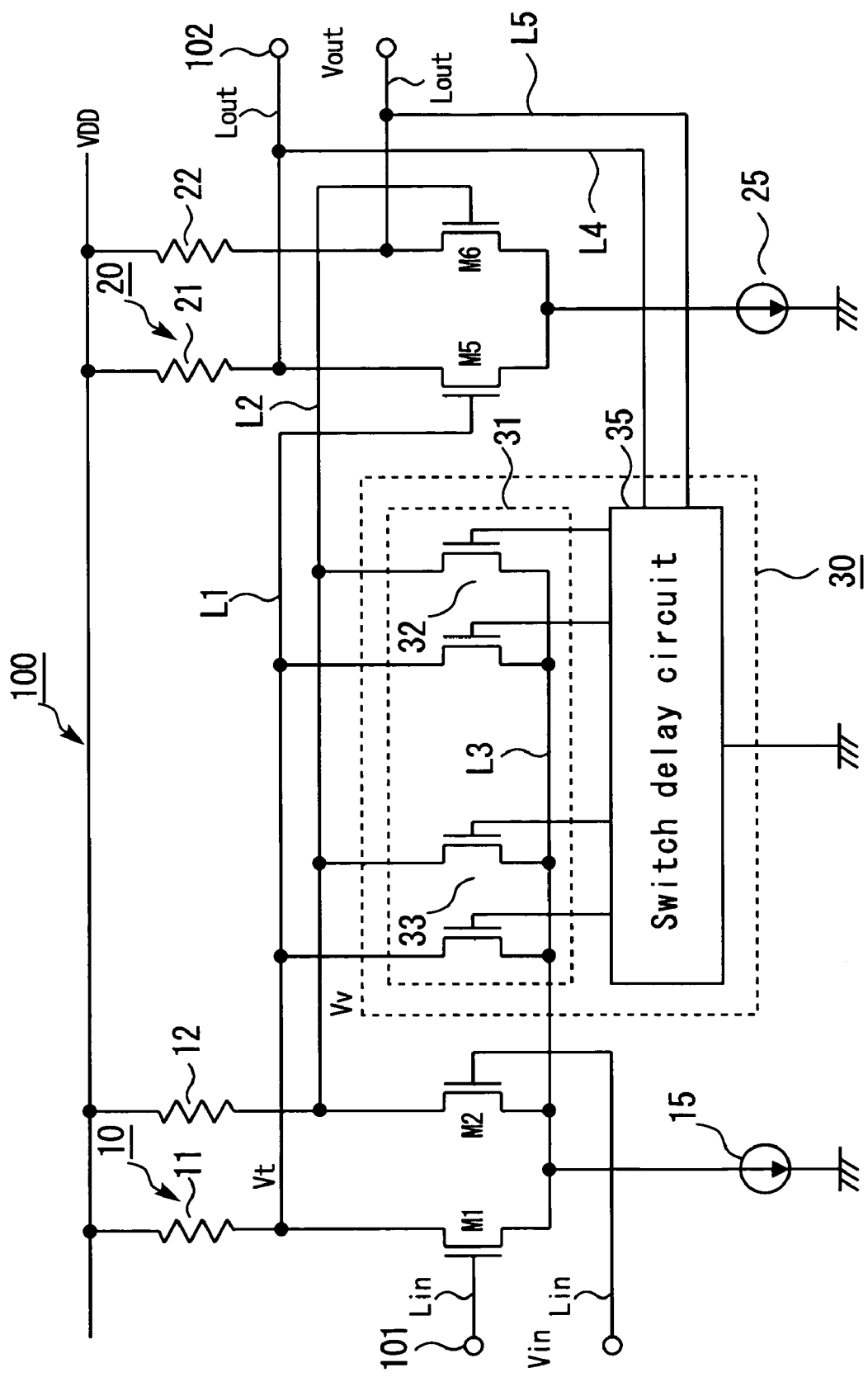
FIG. 1 is a first embodiment of a digital signal buffer circuit according to the present invention.
Figure 2:
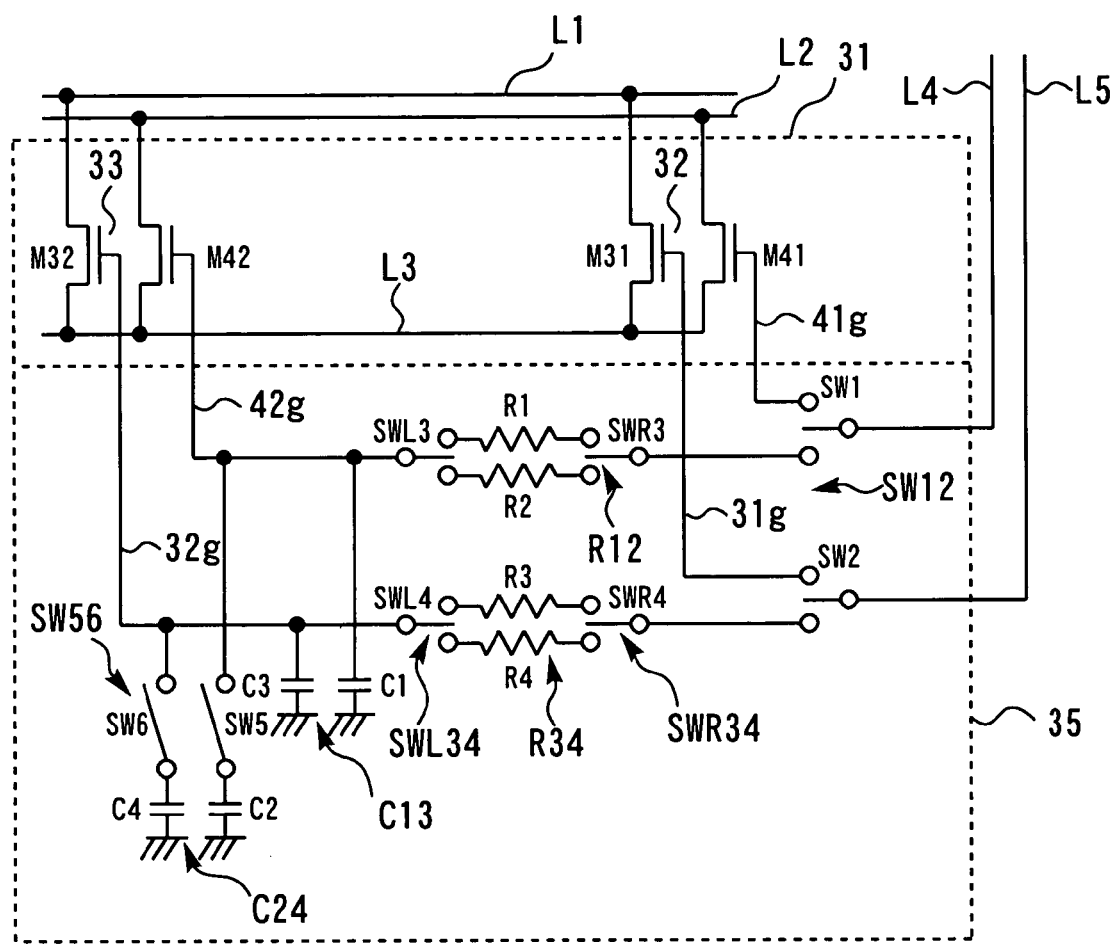
FIG. 2 is the details of the equalization circuit.

FIG. 1 illustrates a first embodiment of a digital signal buffer circuit according to the present invention. FIG. 2 shows the details of its equalization circuit.

The digital signal buffer circuit 100 according to the first embodiment is used, for instance, in a reception circuit that is connected to the output end of a digital transmission path. The buffer circuit 100 according to the first embodiment includes an input terminal 101, an output terminal 102, an input stage buffer 10, an output stage buffer 20, and an equalization circuit 30. The input stage buffer 10, output stage buffer 20, and equalization circuit 30 are connected between the input terminal 101 and output terminal 102. The buffer circuit 100 is made of a semiconductor integrated circuit.

The input stage buffer 10 includes a pair of transistors M1, M2, a pair of resistors 11, 12, and a constant current source 15. For example, the transistors M1, M2 are N-channel MOS transistors. Their sources are connected to a positive potential line VDD via the resistors 11, 12. Their drains are mutually interconnected and connected to a reference potential such as a ground potential via the constant current source 15. The gates of the pair of transistors M1, M2 are connected to the input terminal 101 of the buffer circuit 100 via a pair of input lines Lin. An input digital signal Vin such as an input digital data signal is supplied to the input terminal 101. The junction between resistor 11 and the source of transistor M1 and the junction between resistor 12 and the source of transistor M2 are connected to connection lines L1 and L2, respectively. The input stage buffer 10 outputs a digital conversion signal Vt, which corresponds to an input digital signal Vin, to connection lines L1 and L2.

The output stage buffer 20 includes a pair of transistors M5, M6, a pair of resistors 21, 22, and a constant current source 25. For example, the transistors M5, M6 are N-channel MOS transistors. Their sources are connected to a positive potential line VDD via the resistors 21, 22. Their drains are mutually interconnected and connected to a reference potential such as a ground potential via the constant current source 25. The gates of the pair of transistors M5, M6 are connected to connection lines L1 and L2. The junction between resistor 21 and the source of transistor M5 and the junction between resistor 22 and the source of transistor M6 are connected to the output terminal 102 of the buffer circuit 100 via a pair of output lines Lout, respectively. An output digital signal Vout such as a digital data signal is output to the output terminal 102.

The equalization circuit 30 includes a transistor circuit 31 and a switch delay circuit 35. It gives a digital inverse signal Vv, which is phase inverted and delayed with respect to the input digital signal Vin, to connection lines L1 and L2. FIG. 2 shows the details of the equalization circuit 30. As shown in FIG. 2, the transistor circuit 31 includes two equalization transistor circuits 32, 33. The switch delay circuit 35 includes two equalization resistor circuits R12, R34, two equalization capacitor circuits C13, C24, and four switch circuits SW12, SWR34, SWL34, SW56 for switching among the other circuits.

Equalization transistor circuit 32 includes a pair of equalization transistors M31, M41. Equalization transistor circuit 33 includes a pair of equalization transistors M32, M42. For example, equalization transistors M31, M41, M32, and M42 are all N-channel MOS transistors. Equalization transistors M31 and M41 are both large-size transistors having a great channel width CWb. On the other hand, equalization transistors M32 and M42 are both smaller-size transistors having a small channel width CWs (CWs<CWb).

The sources of equalization transistors M31 and M32 are both connected to connection line L1. The sources of equalization transistors M41 and M42 are both connected to connection line L2. The drains of equalization transistors M31, M41, M32, and M42 are connected to a common line L3. The common line L3 is commonly connected to the drains of transistors M1 and M2 of the input stage buffer 10. Gate line 41g, which is connected to the gate of equalization transistor M41, and gate line 42g, which is connected to the gate of equalization transistor M42, are connected via selector switch SW1 of switch circuit SW12 to feedback line L4, which is connected to one pin of the output terminal 102. Gate line 31g, which is connected to the gate of equalization transistor M31, and gate line 32g, which is connected to the gate of equalization transistor M32, are connected via selector switch SW2 of switch circuit SW12 to feedback line L5, which is connected to the other pin of the output terminal 102.

Equalization resistor circuit R12 is connected to the gate lines 41g, 42g of equalization transistors M41 and M42 and includes two equalization resistors R1, R2. The right-hand ends of equalization resistors R1 and R2 are connected to selector switch SW1 via selector switch SWR3 of switch circuit SWR34. The left-hand ends of equalization resistors R1 and R2 are connected to gate line 42g of equalization transistor M42 via selector switch SWL3 of switch circuit SWL34. Equalization resistor circuit R34 is connected to the gate lines 31g, 32g of equalization transistors M31 and M32 and includes two equalization resistors R3, R4. The right-hand ends of equalization resistors R3 and R4 are connected to selector switch SW2 via selector switch SWR4 of switch circuit SWR34. The left-hand ends of equalization resistors R3 and R4 are connected to gate line 32g of equalization transistor M32 via selector switch SWL4 of switch circuit SWL34.

Equalization resistors R1 and R3 both have a great resistance value Rb, whereas equalization resistors R2 and R4 have a small resistance value Rs (Rs<Rb).

Capacitor equalization circuit C13 includes two equalization capacitors C1, C3. Capacitor equalization circuit C24 includes two equalization capacitors C2, C4. Equalization capacitor C1 is connected between gate line 42g of equalization transistor M42 and the reference potential. Equalization capacitor C3 is connected between gate line 32g of equalization transistor M32 and the reference potential. Equalization capacitors C2 and C4 are respectively connected to gate lines 42g and 32g via selector switches SW5 and SW6 of switch circuit SW56.

Equalization capacitors C1 and C3 both have a great capacitor value Cb, whereas equalization capacitors C2 and C4 have a smaller capacitor value Cs (Cs<Cb).

In the buffer circuit 100 shown in FIG. 1, the amplitude adjustment of the digital inverse signal Vv to be provided in the equalization circuit 30 is made by switch circuit SW12. In a first state in which selector switch SW1 of switch circuit SW12 connects gate line 41g of equalization transistor M41 to feedback line L4 and selector switch SW2 connects gate line 31g of equalization transistor M31 to feedback line L5, equalization transistors M31 and M41 operate to supply digital inverse signal Vv1 to connection lines L1 and L2. Equalization transistors M31 and M41 both have a great channel width CWb and flow a relatively large signal current. Therefore, digital inverse signal Vv1 has a great amplitude as indicated by a broken line in FIG. 3B.

On the other hand, in a second state in which selector switch SW1 of switch circuit SW12 connects gate line 42g of equalization transistor M42 to feedback line L4 and selector switch SW2 connects gate line 32g of equalization transistor M32 to feedback circuit L5, equalization transistors M32 and M42 operate to supply digital inverse signal Vv2 to connection lines L1 and L2. Equalization transistors M32 and M42 both have a small channel width CWs and flow a relatively small signal current. Therefore, digital inverse signal Vv2 has a small amplitude as indicated by a solid line in FIG. 3B.

When digital inverse signal Vv1, which has a great amplitude, is added to the input digital signal Vin, which is shown in FIG. 3A, output digital signal Vout1, which is indicated by a broken line in FIG. 3C, is output to the output terminal 102. Further, when digital inverse signal Vv2, which has a small amplitude, is added to the input digital signal Vin, which is shown in FIG. 3A, output digital signal Vout2, which is indicated by a solid line in FIG. 3C, is output to the output terminal 102. As described above, the first embodiment adjusts the amplitudes of digital inverse signals Vv1 and Vv2 by causing switch circuit SW12 to switch between the first state in which equalization transistors M31 and M41 operate and the second state in which equalization transistors M32 and M42 operate.

The delay amount adjustment to be made by the equalization circuit 30 will now be described. Switch circuits SW12, SWR34, SWL34, and SW56 make a switch in order to adjust the delay amount. In a first state in which selector switches SW1 and SW2 connect gate lines 41g and 31g of equalization transistors M41 and M31 to feedback lines L4 and L5, digital inverse signal Vv is given a small amount of delay, which results from the parasitic capacitance values and parasitic resistance values of gate lines 41g and 31g and feedback lines L4 and L5.

In a second state in which selector switches SW1 and SW2 connect gate lines 42g and 32g of equalization transistors M42 and M32 to feedback lines L4 and L5, the amount of delay provided by equalization resistor circuits R12 and R34 and capacitor equalization circuits C13 and C24 is added to the amount of delay provided by the parasitic resistance values and parasitic capacitance values of feedback lines L4 and L5.

Equalization resistor circuit R12 is selected by using selector switch SWR3 of switch circuit SWR34 and selector switch SWL3 of switch circuit SWL34. Switch circuits SWR34 and SWL34 are interlocked with each other. Selector switches SWR3 and SWL3 and selector switches SWR4 and SWL4 are interlocked with each other. When selector switch SWR3 is connected to equalization resistor R1, selector switch SWL3 is also connected to equalization resistor R1, and equalization resistor R1 is connected to gate line 42g of equalization transistor M42. When selector switch SWR3 is connected to equalization resistor R1, selector switch SWR4 is connected to equalization resistor R3. In this instance, selector switch SWL4 is also connected to equalization resistor R3, and equalization resistor R3 is connected to gate circuit 32g of equalization transistor M32. Equalization resistors R1 and R3 have a great resistance value Rb and give the great resistance value Rb to gate lines 42g and 32g of equalization transistors M42 and M32.

When selector switch SWR3 is connected to equalization resistor R2, selector switch SWL3 is also connected to equalization resistor R2, and equalization resistor R2 is connected to gate line 42g of equalization transistor M42. When selector switch SWR3 is connected to equalization resistor R2, selector switch SWR4 is connected to equalization resistor R4. In this instance, selector switch SWL4 is also connected to equalization resistor R4, and equalization resistor R4 is connected to gate circuit 32g of equalization transistor M32. Equalization resistors R2 and R4 have a small resistance value Rs and give the small resistance value Rs to gate lines 42g and 32g of equalization transistors M42 and M32.

Equalization capacitors C1 and C3 of equalization capacitor circuit C13 give a great capacitance Cb to gate lines 42g and 32g of equalization transistors M42 and M32 at all times. Selector switches SW5 and SW6 of switch circuit SW56 connect equalization capacitors C2 and C4 of equalization capacitor circuit C24 to gate lines 42g and 32g of equalization transistors M42 and M32. When selector switches SW5 and SW6 turn ON, a small capacitance Cs is connected in parallel to a great capacitance Cb, which is derived from equalization capacitors C1 and C3.

When equalization resistor circuits R12 and R34 give a great resistance value Rb, which is derived from equalization resistors R1 and R3, and equalization capacitor circuit s C13 and C24 give a great capacitance Cb+Cs, which is obtained with equalization capacitors C1 and C3 connected in parallel to equalization capacitors C2 and C4, the maximum delay amount is given to gate lines 42g and 32g of equalization transistors M42 and M32. When equalization resistor circuits R12 and R34 give a small resistance value Rs, which is derived from equalization resistors R2 and R4, and equalization capacitor circuit C13 gives an equalization capacitance Cs, which is derived from equalization capacitors C1 and C3, the minimum delay amount is given to gate lines 42g and 32g of equalization transistors M42 and M32.

A delay amount midway between the maximum delay amount and minimum delay amount is given in a state where equalization resistor circuits R12 and R34 give a large resistance value Rb, which is derived from equalization resistors R1 and R3, and equalization capacitor circuit s C13 and C24 give an equalization capacitance Cb, which is derived from equalization capacitors C1 and C3, and in a state where equalization resistor circuits R12 and R34 give a small resistance value Rs, which is derived from equalization resistors R2 and R4, and equalization capacitor circuit s C13 and C24 give a great capacitance Cb+Cs, which is derived from equalization capacitors C1, C3, C2, and C4. When different midway amounts are given, a total of four different delay amounts are selectable.

When the delay amount of the equalization circuit 30 is selectively used, a change emphasis timing adjustment can be made on the output digital signal Vout as indicated in FIGS. 4A, 4B, and 4C. FIG. 4A shows the input digital signal Vin. FIG. 4B shows digital inverse signals Vv3 and Vv4, which are derived from two typical delay amounts such as the above-mentioned maximum delay amount and minimum delay amount. FIG. 4C shows output digital signals Vout3 and Vout4. When digital inverse signal Vv3, which has the maximum delay amount that is indicated by a broken line in FIG. 4B, is selected, output digital signal Vout3, which is indicated by a broken line in FIG. 4C, is obtained. When digital inverse signal Vv4, which has the minimum delay amount that is indicated by a solid line in FIG. 4B, is selected, output digital signal Vout4, which is indicated by a solid line in FIG. 4C, is obtained.

As described above, the digital signal buffer circuit 100 according to the first embodiment selects a digital inverse signal Vv whose amplitude level and delay amount are adjusted by making a selection with switch circuits SW12, SWR34, SWL34, and SW56 of the equalization circuit 30, and emphasizes a change in the output digital signal Vout while adjusting it in accordance with the amplitude level and frequency of the digital signal to be transmitted.

Second Embodiment

In the first embodiment shown in FIG. 2, a third state maybe given to selector switches SW1 and SW2 of switch circuit SW12 in addition to the above-mentioned first state and second state. In the third state, gate lines 31g and 41g of equalization transistors M31 and M41 are connected to feedback lines L4 and L5, and gate lines 32g and 42g of equalization transistors M32 and M42 are also connected to feedback lines L4 and L5.

Figure 5:
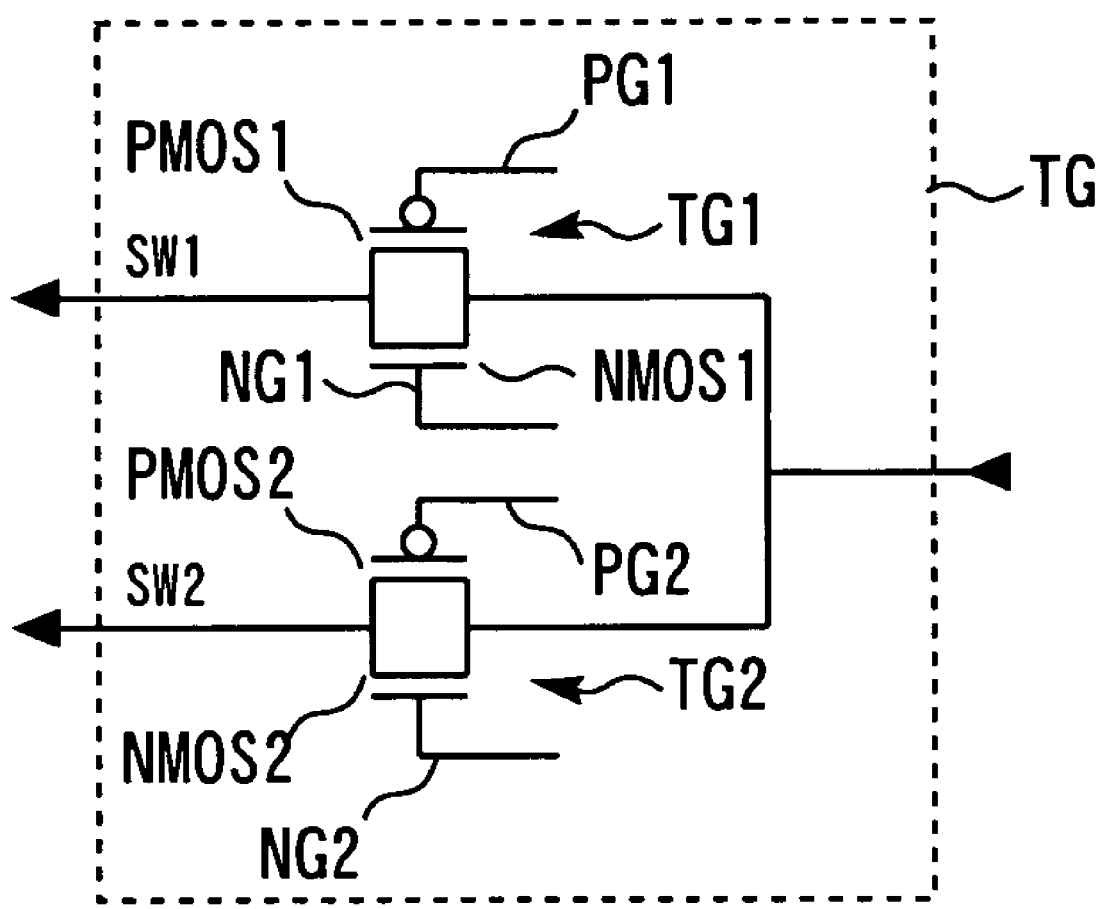
FIG. 5 is the transfer gate circuit TG.

Selector switches SW1 and SW2, which provides the third state in addition to the first state and second state, can be implemented by using a transfer gate circuit TG as indicated in FIG. 5. The transfer gate circuit TG includes transfer gates TG1 and TG2. Transfer gate TG1 is obtained by arranging an N-channel MOS transistor NMOS1 and a P-channel MOS transistor PMOS1 in parallel to each other. It turns OFF when a control gate NG1 of the N-channel MOS transistor NMOS1 is at a low level (L level) and a control gate PG1 of the P-channel MOS transistor PMOS1 is at a high level (H level). It turns ON when the control gate NG1 of the N-channel MOS transistor NMOS1 is at a high level (H level) and the control gate PG1 of the P-channel MOS transistor PMOS1 is at a low level (L level).

Transfer gate TG2 is obtained by arranging an N-channel MOS transistor NMOS2 and a P-channel MOS transistor PMOS2 in parallel to each other. It turns OFF when a control gate NG2 of the N-channel MOS transistor NMOS2 is at a low level (L level) and a control gate PG2 of the P-channel MOS transistor PMOS2 is at a high level (H level). It turns ON when the control gate NG2 of the N-channel MOS transistor NMOS2 is at a high level (H level) and the control gate PG2 of the P-channel MOS transistor PMOS2 is at a low level (L level).

The transfer gate circuit TG forms selector switch SW1 by connecting the right-hand terminals for transfer gates TG1 and TG2 to feedback line L4, connecting the left-hand terminal for transfer gate TG1 to gate line 41g of equalization transistor M41, and connecting the left-hand terminal for transfer gate TG2 to selector switch SWR3.

Another transfer gate circuit TG, which looks like FIG. 5, is also furnished to form selector switch SW2 by connecting the right-hand terminals for transfer gates TG1 and TG2 of the transfer circuit TG to feedback line L5, connecting the left-hand terminal for transfer gate TG1 to gate line 31g of equalization transistor M31, and connecting the left-hand terminal for transfer gate TG2 to selector switch SWR4.

When the transfer gate circuits TG form selector switches SW1 and SW2 as described above, selector switches SW1 and SW2 can be individually operated in the first state, second state, and third state.

In the third state, equalization transistors M32 and M42 operate in parallel with equalization transistors M31 and M41 so that the digital inverse signal Vv has an amplitude that is intermediate between the amplitudes of signals Vv1 and Vv2, which are shown in FIG. 3B. Further, the output digital signal Vout also has an amplitude that is intermediate between the amplitudes of signals Vout1 and Vout2, which are shown in FIG. 3C.

In the third state of switch circuit SW12, the delay amount of the digital inverse signal Vv can be adjusted in four steps at the above-mentioned intermediate level by making a selection with switch circuits SWR34, SWL34, and SW56.

Third Embodiment

In a third embodiment, selector switches SW1 and SW2 for the first embodiment are formed by the transfer gates TG shown in FIG. 5, and selector switches SWR3, SWL3, SWR4, and SWL4 are formed by the transfer gates TG shown in FIG. 5.

In the third embodiment, selector switches SWR3 and SWL3 are formed by the transfer gates TG shown in FIG. 5 so that a resistance value derived from a parallel connection between equalization resistors R1 and R2 can be given to gate line 42g of equalization transistor M42. Further, selector switches SWR4 and SWL4 are formed by the transfer gates TG shown in FIG. 5 so that a resistance value, derived from a parallel connection between equalization resistors R3 and R4, can be given to gate line 32g of equalization transistor M32. As a result, the delay amount can be adjusted in an increased number of steps.

Fourth Embodiment

Figure 6:
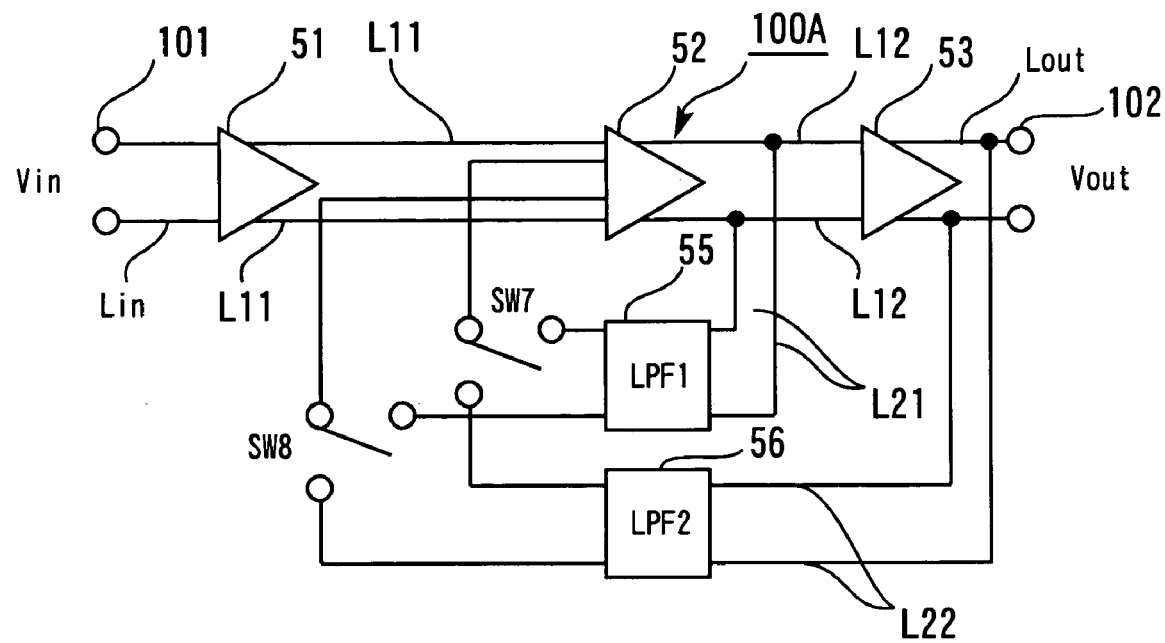
FIG. 6 is a fourth embodiment of the digital signal buffer circuit according to the present invention.

FIG. 6 illustrates a fourth embodiment of the digital signal buffer circuit according to the present invention. The buffer circuit 100A according to the fourth embodiment includes three buffers 51, 52, 53, two low-pass filters 55, 56, and selector switches SW7, SW8. Buffer 51 is an input stage buffer, configured the same as the input stage buffer 10 shown in FIG. 1, and includes transistors M1 and M2. This input stage buffer 51 is connected to the input terminal 101 via an input line Lin. Buffer 53 is an output stage buffer, configured the same as the output stage buffer 20 shown in FIG. 1, and includes transistors M5 and M6. This output stage buffer 53 is connected to the output terminal 102 via an output line Lout. Buffer 52 is an intermediate buffer and connected between the input stage buffer 51 and output stage buffer 53. The intermediate buffer 52 is connected to the input stage buffer 51 via connection line L11. Further, the intermediate buffer 52 is connected to the output stage buffer 53 via connection line L12.

The intermediate buffer 52 is a combination of the input stage buffer 10 and equalization circuit 30, which are shown in FIG. 1. The intermediate buffer 52 comprises the transistor circuit 31 shown in FIG. 2. The transistor circuit 31 includes transistor equalization circuits 32 and 33. Equalization transistor circuit 32 has equalization transistors M31 and M41, which have a great gate width. Equalization transistor circuit 33 has equalization transistors M41 and M42, which have a small gate width. Either of these equalization transistor circuits 32, 33 is switch selected.

The low-pass filters 55, 56 have different resistance values and capacitance values so as to give different delay amounts. Low-pass filter 55 is positioned in feedback line L21, which is between connection line L12 and the gate circuits of equalization transistor circuits 32 and 33 of the intermediate buffer 52. Low-pass filter 56 is positioned in feedback line L22, which is between the output line Lout and the gate circuits of equalization transistor circuits 32 and 33 of the intermediate buffer 52. Selector switch SW7 is connected between low-pass filter 55 and equalization transistor circuits 32 and 33 of the intermediate buffer 52. Selector switch SW8 is connected between low-pass filter 56 and equalization transistor circuits 32 and 33 of the intermediate buffer 52.

When selector switches SW7 and SW8 are connected to low-pass filter 55, low-pass filter 55 is connected to the gate circuit of equalization transistor circuit 32 or 33 of the intermediate buffer 52 so that the delay amount of low-pass filter 55 is given from connection line L12, which is between the intermediate buffer 52 and output buffer 53, to a digital data signal that is fed back via feedback line L21. When selector switches SW7 and SW8 are connected to low-pass filter 56, on the other hand, the delay amount of low-pass filter 56 is given from the output line Lout to a feedback digital data signal that is fed back via feedback line L22, which is routed to equalization transistor circuit 32 or 33 of the intermediate buffer 52.

In accordance with switching between feedback lines L21 and L22 and switching between low-pass filters 55 and 56, the amplitude and delay amount of the digital inverse signal Vv can be adjusted.

Fifth Embodiment

Figure 7:
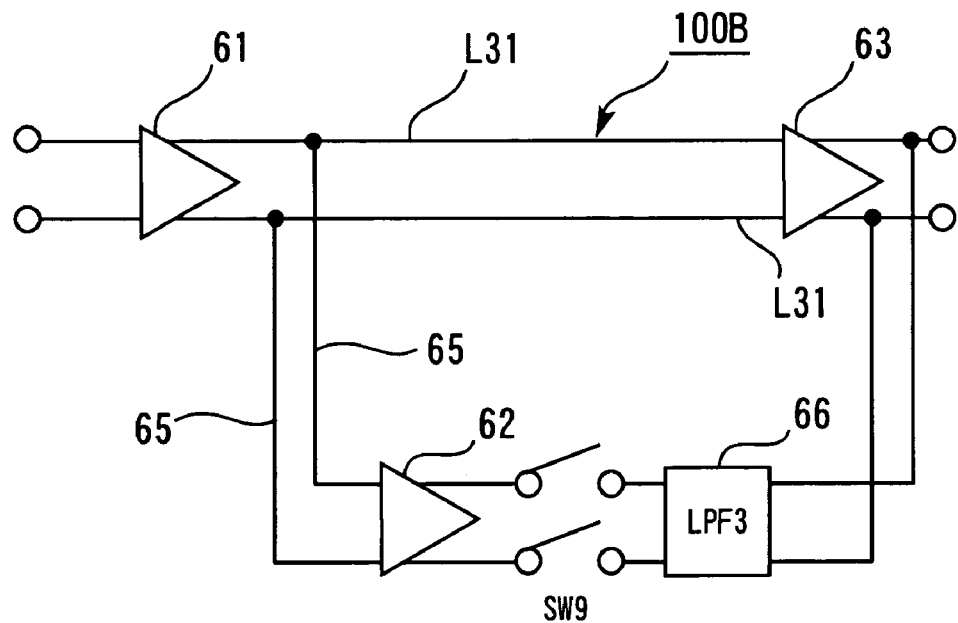
FIG. 7 is a fifth embodiment of the digital signal buffer circuit according to the present invention.

FIG. 7 illustrates a fifth embodiment of the digital signal buffer circuit according to the present invention. The buffer circuit 100B according to the fifth embodiment includes an input stage buffer 61 and an output stage buffer 63. The input stage buffer 61 is configured the same as the input stage buffer 10 shown in FIG. 1 and includes transistors M1 and M2. The output stage buffer 63 is a combination of the input stage buffer 10 shown in FIG. 1 and the transistor circuit 31 shown in FIG. 2 and includes equalization transistor circuits 32 and 33. The input stage buffer 61 and output stage buffer 63 are connected with connection line L31.

A delay path 65, which is configured in a feed-forward manner, is formed between the input stage buffer 61 and the transistor circuit 31 of the output stage buffer 63. The feed-forward delay path 65 is formed between the input stage buffer 61 and the gate circuits of equalization transistor circuits 32 and 33 in the output stage buffer 63.

The delay path 65 includes an intermediate buffer 62, a switch SW9, and a low-pass filter 66. When switch SW9 turns ON, the intermediate buffer 62 supplies a digital inverse signal Vv in a feed-forward manner to the gate circuits of equalization transistor circuits 32 and 33, which are included in the output stage buffer 63. A delay is given to this digital inverse signal Vv by low-pass filter 66.

The fifth embodiment supplies a digital inverse signal Vv in a feed-forward manner and uses low-pass filter 66 to set its delay amount.

The digital signal buffer circuit according to the present invention is used in a digital signal communication system based on a transmission path, for instance, to emphasize a digital data change at a receiving end or transmitting end.

The major benefits of the present invention described above are summarized as follows:

The digital signal buffer circuit according to the present invention can adjust the amplitude level and delay amount of a digital inverse signal that is obtained by inverting an input digital signal and delayed. Therefore, it is possible to adjust the amplitude level and delay amount of the digital inverse signal in accordance with input digital signals having different amplitudes and frequencies, and generates an output digital signal in which a change is effectively emphasized. It is also possible to easily correct changes in the characteristic in a digital signal buffer circuit manufacturing process.

The invention claimed is:

1. A digital signal buffer circuit, comprising:
an equalization circuit for generating a digital inverse signal that is delayed from an input digital signal and obtained by inverting said input digital signal,
wherein said equalization circuit includes a plurality of variously-sized equalization transistors, a delay circuit capable of changing the delay amount, and a switching circuit for switching between said plurality of transistors and changing the delay amount of said delay circuit.

2. The digital signal buffer circuit according to claim 1, wherein said switching circuit includes a first switch for switching between said plurality of transistors and a second switch for changing the delay amount of said delay circuit.

3. The digital signal buffer circuit according to claim 2, wherein said first switch comprises a transfer gate circuit.

4. The digital signal buffer circuit according to claim 2, wherein said first switch and said second switch both comprise a transfer gate circuit.

5. The digital signal buffer circuit according to claim 1, wherein said delay circuit includes a plurality of equalization resistors having different resistance values and a plurality of equalization capacitors having different capacitance values, and wherein the delay amount is changed by switching between the plurality of equalization resistors and between the plurality of equalization capacitors.

6. The digital signal buffer circuit according to claim 5, wherein said switching circuit includes a third switch for switching between said plurality of equalization resistors and a fourth switch for switching between said plurality of equalization capacitors.

7. The digital signal buffer circuit according to claim 1, further comprising:
an input stage buffer for letting the gates of a pair of transistors receive an input digital signal and an output stage buffer for letting the gates of a pair of transistors receive the output of said input stage buffer,
wherein a plurality of transistors in said equalization circuit receive the output of said output stage buffer and apply said digital inverse signal to the gates of the transistors of said output stage buffer.

8. A digital signal buffer circuit, comprising:
a first buffer for receiving an input digital signal;
a second buffer for receiving the output of said first buffer; and
a third buffer for generating an output digital signal upon receipt of an output from said second buffer,
wherein said second buffer includes an equalization transistor, which generates a digital inverse signal that is obtained by inverting said input digital signal and delayed, and switches between a first feedback line for feeding the output of said second buffer back to said equalization transistor and a second feedback line for feeding the output of said third buffer back to said equalization transistor.

9. The digital signal buffer circuit according to claim 8, wherein said first feedback line and said second feedback line are connected to low-pass filters that provide different delay amounts.

10. A digital signal buffer circuit, comprising:
a first buffer for receiving an input digital signal; and
a second buffer for generating an output digital signal upon receipt of an output from said first buffer,
wherein said second buffer includes an equalization transistor for generating a digital inverse signal that is obtained by inverting said input digital signal and delayed; and
wherein a delay path, which includes a switch and a low-pass filter, is formed between the output of said first buffer and said equalization transistor.

* * * * *